(12) United States Patent
Ferguson et al.

(10) Patent No.: US 9,684,688 B2
(45) Date of Patent: Jun. 20, 2017

(54) SYSTEM AND METHODS FOR MATCHING IDENTIFIABLE PATTERNS AND ENABLING ASSOCIATED ACTIONS

(75) Inventors: Geordon Thomas Ferguson, Mississauga (CA); Lenko Grigorov, London (CA); Jonathan Chan, Oakville (CA); Cassidy Paul Gentle, Kitchener (CA); Ngoc Bich Ngo, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 119 days.

(21) Appl. No.: 14/404,173

(22) PCT Filed: Jul. 6, 2012
(Under 37 CFR 1.47)

(86) PCT No.: PCT/CA2012/050458
§ 371 (c)(1),
(2), (4) Date: Oct. 16, 2015

(87) PCT Pub. No.: WO2014/005209
PCT Pub. Date: Jan. 9, 2014

(65) Prior Publication Data
US 2016/0147815 A1 May 26, 2016

(51) Int. Cl.
| | |
|---|---|
| *G06F 17/30* | (2006.01) |
| *G06F 17/22* | (2006.01) |
| *G06K 9/00* | (2006.01) |
| *G06K 9/72* | (2006.01) |
| *G06F 9/445* | (2006.01) |

(52) U.S. Cl.
CPC .......... *G06F 17/30371* (2013.01); *G06F 8/62* (2013.01); *G06F 17/2235* (2013.01); *G06F 17/30377* (2013.01); *G06F 17/30424* (2013.01); *G06F 17/30893* (2013.01); *G06K 9/00979* (2013.01); *G06K 9/72* (2013.01)

(58) Field of Classification Search
None
See application file for complete search history.

(56) References Cited

U.S. PATENT DOCUMENTS

| | | | |
|---|---|---|---|
| 9,396,476 B2* | 7/2016 | Walker | G06F 17/30855 |
| 2008/0086700 A1 | 4/2008 | Rodriguez et al. | |
| 2009/0254572 A1* | 10/2009 | Redlich | G06Q 10/06 |
| 2011/0302161 A1 | 12/2011 | Walker et al. | |

(Continued)

OTHER PUBLICATIONS

Linkify | Android Developers; retrieved online from http://developer.android.com/reference/android/text/util/Linkify.html; published at least as early as Jun. 12, 2012.

(Continued)

*Primary Examiner* — Hosain Alam
*Assistant Examiner* — Tuan-Khanh Phan
(74) *Attorney, Agent, or Firm* — Jose Gutman; Fleit Gibbons Gutman Bongini & Bianco P.L.

(57) ABSTRACT

A system and method are provided, the method comprising: receiving, at a registry service, a request to register an identifiable pattern for matching patterns in text; registering, in a registry, the identifiable pattern and a corresponding handler for performing an action; and updating at least one client library accessible to a corresponding client process with the identifiable pattern.

21 Claims, 14 Drawing Sheets

(56) References Cited

U.S. PATENT DOCUMENTS

2012/0096163 A1* 4/2012 Tai ..................... H04L 41/0856
709/226
2013/0304800 A1* 11/2013 Smith .................. H04W 4/003
709/203

OTHER PUBLICATIONS

Hyam, K.; International Search Report from PCT Application No. PCT/CA2012/050458; search completed Mar. 5, 2013.

* cited by examiner

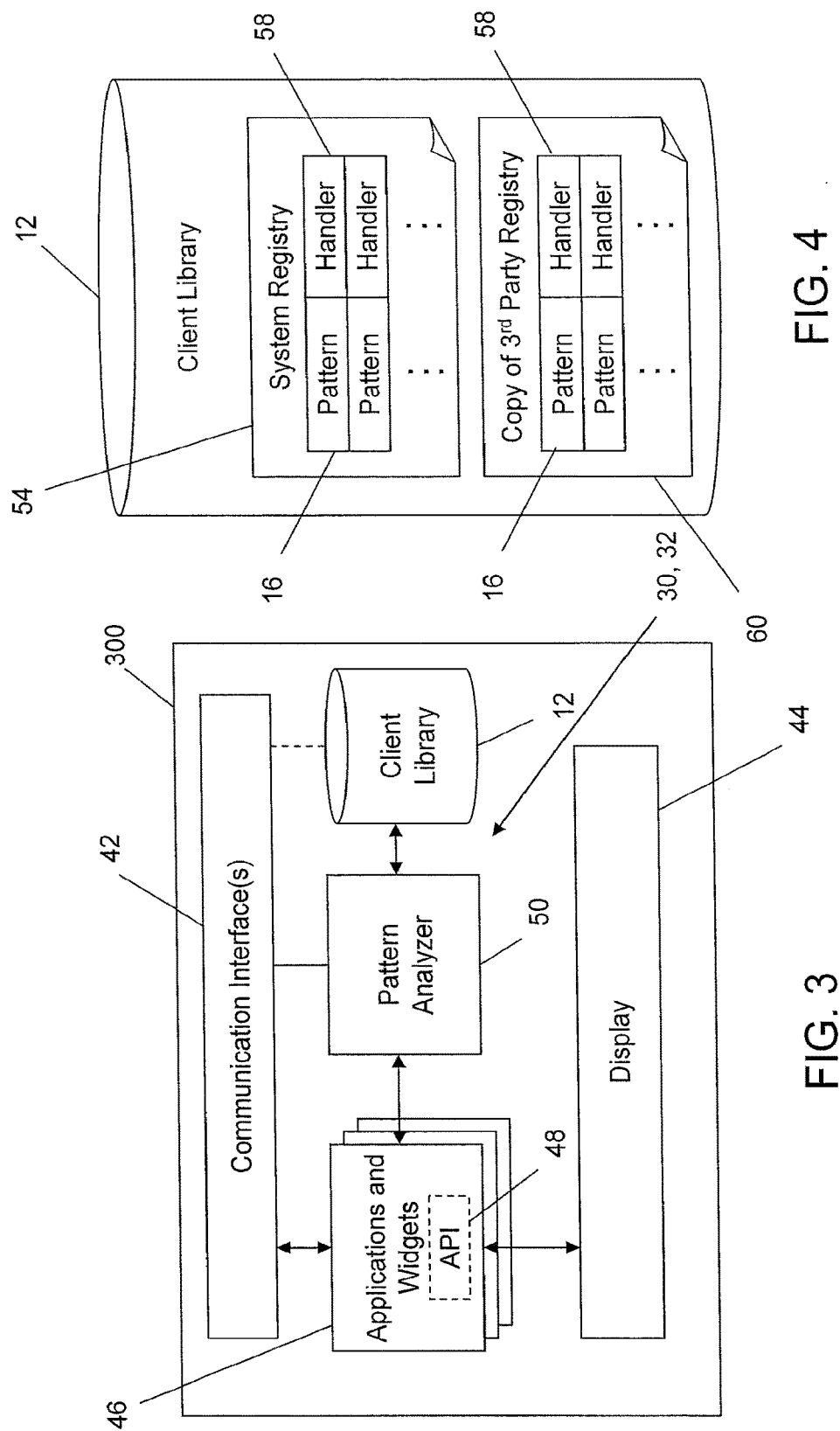

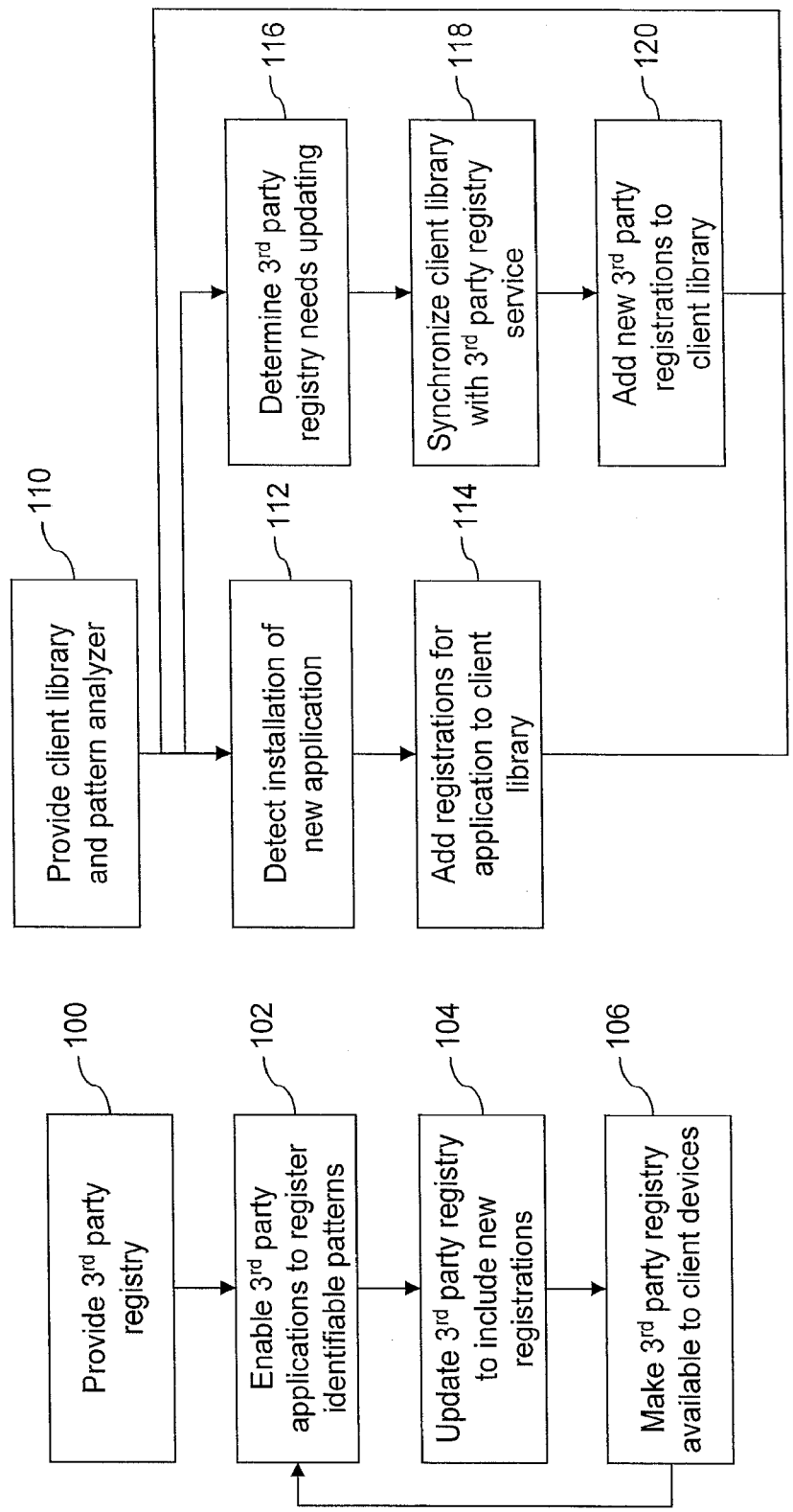

SYSTEM AND METHODS FOR MATCHING IDENTIFIABLE PATTERNS AND ENABLING ASSOCIATED ACTIONS

TECHNICAL FIELD

The following relates to systems and methods for matching identifiable patterns and enabling associated actions with matched patterns, including context sensitive actions.

DESCRIPTION OF THE RELATED ART

Text that is communicated and displayed on electronic devices, such as smart phones, often include sequences of characters or "strings" that can be matched to particular actions. For example, phone numbers, uniform resource locators (URLs), email addresses, etc., that are included in the text of an email can be recognized or otherwise matched to known text. Recognizers can be configured to compare the text against various sources, such as address book entries, etc. Recognizers also rely on known text referred to as a regular expression (regex). Active text regions may then be generated based on matches, e.g., using a hyperlink, to enable a user to select the associated string within the text, to then invoke an action such as initiating a phone call associated with the phone number, compose a new email addressed to the email address, open a browser to direct the user to the URL, etc.

Linking string matches in text may provide a convenient tool to allow users to link to other applications and services, however, the effectiveness of this mechanism relies on the accuracy, currency, and comprehensiveness of the collection of string entries available to the application or service requesting actionable links.

SUMMARY

There is provided a method comprising: receiving, at a registry service, a request to register an identifiable pattern for matching patterns in text; registering, in a registry, the identifiable pattern and a corresponding handler for performing an action; and updating at least one client library accessible to a corresponding client process with the identifiable pattern.

There is also provided a computer readable storage medium comprising computer executable instructions for performing the method.

There is also provided an electronic device comprising a processor and memory, the memory comprising computer executable instructions for causing the processor to perform the method.

BRIEF DESCRIPTION OF THE DRAWINGS

Embodiments will now be described by way of example only with reference to the appended drawings wherein:

FIG. 3 is a block diagram illustrating an example of a configuration for a client device;

FIG. 4 is a schematic diagram illustrating a client library;

FIG. 6 is a flow chart illustrating example computer executable operations that may be performed in updating a $3^{rd}$ party registry and making the $3^{rd}$ party registry available to client processes;

FIG. 7 is a flow chart illustrating example computer executable operations that may be performed in updating a client library for a client process;

DETAILED DESCRIPTION

Figure 1:
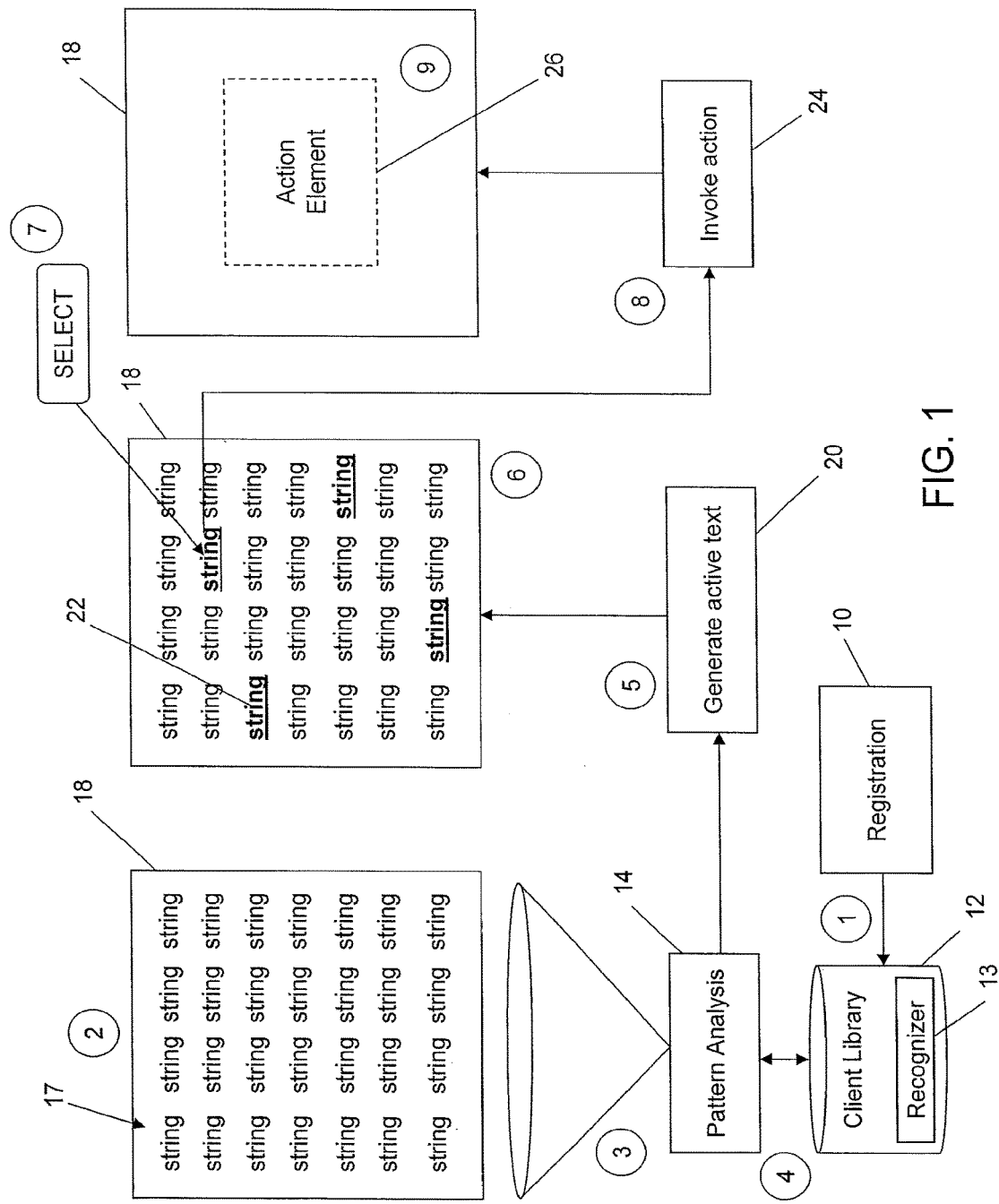
FIG. 1 is a schematic illustration of a pattern analysis method for adding links to text.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It has been found that the linking of identifiable patterns in a text widget (an application containing text), e.g., using recognizers (computer executable code which recognizes character string patterns such as regex or other identifiable string pattern matches), can be both kept up to date and provided in an efficient manner by maintaining a registry of identifiable patterns (e.g., character strings (also referred to herein as strings), string identifiers (IDs), string types, or regexes—collectively referred to hereinafter as "patterns" for brevity); and handlers (computer executable code which perform actions based on the patterns). By providing a registry service, $3^{rd}$ party applications and updates to the registry can be disseminated to client processes having a client library. The client library on the client process may therefore utilize the registry service to maintain a synchronized list of patterns and handlers that may be used in performing pattern analyses for the client process. The registry service can be provided by a server process or other entity to enable public access to up to date $3^{rd}$ party application registrations enabling client process to perform local pattern analyses while having the ability to obtain $3^{rd}$ party registrations as they are added to a central $3^{rd}$ party registry, e.g., to add new patterns and handlers to the client library when a new $3^{rd}$ party application is installed.

It has also been recognized that by enabling $3^{rd}$ party applications to register identifiable patterns and associated handlers, in addition to system registrations that are associated with core applications, the likelihood of duplicate and/or overlapping pattern matches may increase. To resolve duplicate and/or overlapping pattern matches, it has been found that applying priorities to particular entries in the client library can be used. Another way to resolve duplicate matches is to apply rules to resolve conflicts and such rules can be applied based on the source of the matches, e.g., an internal source versus an external source. In an example embodiment, an internal source is a core, platform or system application of a client device, that is associated with core services of the client device and may have been installed on the client device at the time of manufacture or initial registration of the device. Examples of core, platform or system applications are a phone application, an address application, and an email application developed by the manufacturer of the client device. In an example embodiment, an external source is a $3^{rd}$ party application that may have been added to a client device. Examples of $3^{rd}$ party applications are applications developed by Yellow Pages and United Parcel Service.

Referring now to FIG. 1, a schematic illustration of a pattern matching and linking method is shown. A registration 10 of patterns 16 (e.g., of strings that may be included in text 17 as shown in FIG. 1) and associated handlers 58 (FIG. 4) are added or otherwise included in a client library 12 that is stored on or otherwise accessible to a client process 30 (see also FIG. 2). The client library 12 includes or is otherwise programmed to utilize one or more recognizers 13, e.g. regex or other string pattern matching mechanisms. It can be appreciated that the recognizer 13 shown in FIG. 1 is for illustrative purposes only and may be integral with or otherwise programmed into the client library 12. The client library 12 is accessed and utilized in performing a pattern analysis 14 of, for example, strings included in a portion of text 17. The text 17 may be displayed in a user interface (UI) 18 as shown in FIG. 1. The analysis of the text 17 making reference to the client library 12 enables pattern matching to occur, with matches identified in this example by replacing or modifying matched strings with hyperlinks 22.

In stage 1 shown in FIG. 1, the registration 10 populates the client library 12 to provide a registry of patterns 16 (FIG. 4) (e.g., regexes) that have associated handlers 58 in order to enable linking within the text 17. In stage 2, an application or text widget 46 (FIG. 3) provides a portion of text 17 to be subjected to the pattern analysis 14 in stage 3, which accesses and utilizes the recognizers 13 in the client library 12 in stage 4. Links are added to text at 20 in stage 5 based on matches revealed during the pattern analysis 14. The UI 18 in this example is updated in stage 6 to include the hyperlinks 22 for matched patterns 16. By detecting selection of a particular hyperlink 22 in stage 7, the client device 30 may then invoke an action at 24 in stage 8, the action being determined from the handler 58 associated with the hyperlinked string 22.

It can be appreciated that the action invoked at 24 may take various forms, e.g., visual, audible, tactile, or may trigger an action transparent to the user, e.g., sending a communication, changing a setting, etc. In some examples, shown as stage 9 in dashed lines in FIG. 1, an action element 26 may be displayed in the UI 18. It can be appreciated that the action element 26 may be associated with a different UI or different screen of the UI 18. For example, selection of a hyperlink 22 containing a phone number may invoke a phone application UI.

It can also be appreciated that the hyperlinks 22 shown in FIG. 1 are only one illustrative way of "linking" or otherwise identifying matches that have associated handlers 58. For example, a phone number match in the text 17 may cause the UI 18 to display a phone icon and picture of the associated contact. Similarly, an address match may cause the UI 18 to display a thumbnail of a map for the address location, which can be enlarged or selected to invoke a maps application. As such, the matched patterns 16 can be highlighted or identified in various ways.

Figure 2:
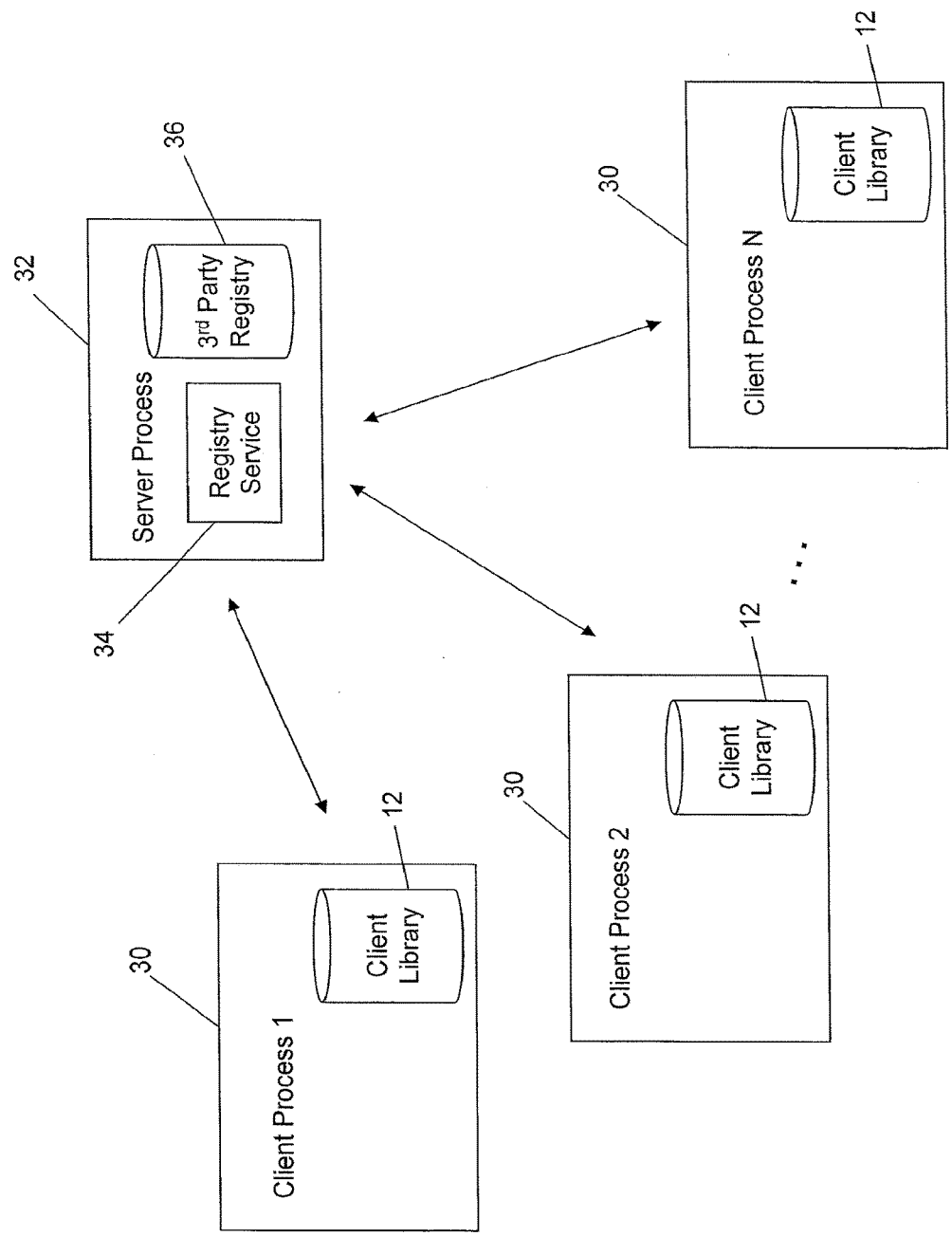
FIG. 2 is a schematic illustration of a client-server system for updating a client library to include $3^{rd}$ party registrations.

Turning now to FIG. 2, an example system architecture is shown for enabling client processes 30 to utilize identifiable pattern registrations of $3^{rd}$ party applications. Each client process 30 maintains a client library 12 that includes a localized copy of registrations for core, platform and/or system applications, and a localized copy of registrations for $3^{rd}$ party applications in a registry 36 maintained by a server process 32. The server process 32 provides a registry service 34 that enables the client-side client library 12 to be updated when new applications are installed, and when new registrations are added by $3^{rd}$ party applications and application developers. In general, the registry service 34 enables any modification to the $3^{rd}$ party registry 36 to be propagated to the client libraries 12 of the client processes 30 in order to allow the client processes 30 to run localized pattern analyses 14 (FIG. 1) rather than having to query the server process 32 and/or registry service 34 at runtime as will be discussed in greater detail below. It can be appreciated that the registry service 34 may also be used to update platform or system-based registrations, e.g., to accommodate new core applications in such a platform or system. It can be appreciated that the client processes 30 shown in FIG. 2 may be running on the same hardware or different hardware in various example embodiments. Similarly, the server process 32 may be running on the same hardware as the client processes 30, or on a separate device (e.g., as part of a network infrastructure or a pair of tethered devices such as a smart phone and tablet computer).

The system configuration shown in FIG. 2 provides a balance between performance and the requirement of keeping a local client library 12 that is synchronized with the $3^{rd}$ party registry 36. The pattern matching that will be described below can be performed using the registry service 34 or on the client side by having the client process 30 synchronize with the server process 32. Since the frequency of requests for pattern matching can be quite high at times, having the registry service 34 used to update the $3^{rd}$ party registry 36 and exposed via an inter-process communication interface, and maintaining an up-to-date client library 12 can minimize the performance hit associated with such frequent requests. It can be appreciated that the registry service 34 may be configured to broadcast updates periodically to registered client libraries 12 of the client processes 30, e.g., using a push model rather than a pull model.

FIG. 3 illustrates an example of a configuration for a client device 300, which may comprise one or more client processes 30 as shown. It can be appreciated that the client device 300 may also include a server process 32 or may communicate with another device (not shown) that is running a server process 32. The configuration shown in FIG. 3 is therefore for illustrative purposes only. The client device 300 includes one or more communication interfaces 42 that enable the client device 300 to communicate with other devices, or be communicated with. The communication interfaces 42 shown in FIG. 3 may include wireless radios, short-range radios, communication ports, media slots, etc. The client device 300 in this example also includes a display 44 to enable, for example, hyperlinks 22 to be displayed for users to select.

Also shown in FIG. 3 are applications and widgets 46 that contain or otherwise utilize or display text 17 (FIG. 1) such that a pattern analysis 14 (FIG. 1) can be performed by a pattern analyzer 50. The applications and widgets 46, unless otherwise specified may be commonly referred to herein as "applications 46" for brevity. The applications 46 may be programmed to be "active" in having all text 17 analyzed for matches, or may utilize an application programming interface (API) 48 to query the pattern analyzer 50 on an event basis, e.g., in response to a user selection or detection of an external event (e.g., change in location of the client device 300). It can be appreciated that the applications 46 can also use the API 48 to query the client library 12 to determine what patterns 16 have been registered. It can be appreciated that system APIs 48 may be provided to: (a) query for a list of registered patterns or certain specific patterns, and/or (b) enable or disable certain or all patterns. In certain circumstances the application 46 may check for the existence of a particular recognizer 13 in order to perform an action. Some applications 48 may not want any or certain text recognition to be performed, and this can be handled by providing an API 48 to disable the recognizer(s). Moreover, it can be appreciated that an application 46 may want to query the list of registered patterns and then decide to only configure a subset of them when analyzing text 17.

For applications 46 that use "active" text analyses, the application 46 may be programmed with a disable or skip functionality to disregard certain registrations in the client library 12 to account for different needs of the application 46. For example, an application 46 may only allow core, platform or system based matches to be returned and not $3^{rd}$ party registrations. Similarly, applications 46 may be developed to enable context-sensitivity. For example, applications 46 can specify that the context for the text 17 being analyzed is contained in a "tweet", "email", "newsfeed", etc. This allows, for example, applications 46 to enable/disable recognizers based on the context of the overall text 17.

The applications 46 use the pattern analyzer 50 to run available pattern recognizer routines to match patterns 16 in provided portions or "blobs" of text 17, as well as interact with the client library 12. It can be appreciated that the API 48 shown in FIG. 3 may represent multiple APIs 48, e.g., an API 48 for accepting patterns to be analyzed for patterns and to return matches, an API 48 for registering and deregistering a pattern, and an API 48 for querying the registered recognizers 13 in the client library 12. The applications 46 can provide, on a per application basis, the ability to toggle the pattern matching service on or off and application developers can be given the option to choose which applications 46 show pattern matches and which do not, as well as what type of text 17 should be analyzed and what should not. For example, the text of a button or label can be omitted from the analysis.

The invocation of the pattern analyzer 50 can be made immediately, for analysis as soon as possible, or using a paced delivery, where the pattern analyzer 50 or sub-routines implemented thereby, is/are invoked at certain intervals to reduce the computational load. Paced delivery can be implemented for applications 46 where it is expected that a certain amount of delay may be tolerated, or if the whole text 17 is not immediately viewable but could be after scrolling.

The pattern analyzer 50 includes or otherwise has access to the client library 12. It can be appreciated that one or both of the pattern analyzer 50 and client library 12 may be accessible for communicating with the registry service 34, e.g., to add new registrations when an application 46 is installed, or update the client library 12 according to modifications to the $3^{rd}$ party registry 36 maintained by the server process 32 and registry service 34. The pattern analyzer 50 may also allow for custom analyzer plug-ins to be registered, in addition to, for example, a default scheme such as regex. The pattern analyzer 50 provides a set of pattern matches for a given portion or blob of text 17. Each match contains information about the character position of the match within the text 17, the data type associated with the match, a data element which contains the recognized object, and, if applicable, a target to be invoked to handle the match according to the associated handler 58. Application developers may therefore be provided with a listing of agreed upon data types that are recognized by the pattern analyzer 50 and the format of the associated data. Handlers 58 that act on certain types of data may then be able to register against one of the listed types and be able to process the associated data accordingly.

For example, a phone application 46 and a contacts application 46 could be registered against the same pattern to offer different handlers, e.g. name "call" and "add to contacts". For $3^{rd}$ party registrations, the data associated with a match may be the sub-pattern which matched the expression, and the $3^{rd}$ party application 46, which has registered the matching pattern 16, will be indicated as the handler 58 of the match. In this way, the handler 58 that is specified for the match would be the only handler invoked.

FIG. 4 illustrates a schematic illustration of the contents of the client library 12. In the example shown in FIG. 4, the client library 12 includes a system registry 54, which includes core, system or platform registrations. The system registry 54 includes a series of patterns 16 and associated handlers 58. The patterns 16 may be stored as a regex or in any other suitable form which can be recognized by a recognizer. The handler 58 identifies an action to be taken after detecting selection of, for example, a hyperlinked 22 version of the pattern 16 as shown in FIG. 1. For example, the system registry 54 may identify a pattern 16 containing ten (10) or seven (7) digits as being a phone number and add a link or other identifier to the matched pattern 16 in the text 17 (FIG. 1). If the link is selected by the user, a phone application 46 may be invoked to call that number.

The client library 12 also includes a local copy 60 of the 3$^{rd}$ party registry 36 maintained by the server 32. The local copy 60 also includes a series of patterns 16, e.g., regexes used to match patterns 16 with associated handlers 58 to enable an action to be invoked. It can be appreciated that the client library 12 may also include, for at least some registrations, information about a visual representation and behavior for a match. For example, a pattern 16 associated with invoking a phone application handler 58 may specify that the phone number should be underlined in a particular color or font. Specifying such visual representations can allow for consistency in the UI between different runtimes.

The client library 12 may also use the above-mentioned analyzer plug-ins to perform the pattern matching, in addition to, for example, a regular expression analyzer to handle 3$^{rd}$ party regular expressions (regex). The plug-in analyzers provide an interface that accepts text 17 (e.g., in plaintext format) for analysis, and generates a collection of matches. Platform or system based analyzers may be implemented separately from the 3rd party analyzers by integrating the system registry 54 separately from the copy of the 3$^{rd}$ party registry 60, e.g., as shown in FIG. 4.

The pattern analyzer's various routines may find matches in the same region of a pattern 16, resulting in a match overlap. The routines may also find overlapping matches that cannot be disambiguated and, therefore, may keep the overlapping matches. For example, a single number could match both a phone number and a personal identification number (PIN) of a client device, or a courier tracking number could also match a phone number. In order to deal with pattern match overlaps, the pattern analyzer 50 can utilize priorities to create partial ordering between matches. Matches with higher priority may then override those with a lower priority (e.g., a mailing address can override a phone number). Matches with the same priority may remain ambiguous when associated with the system registry 54, and for 3$^{rd}$ party registrations, may always remain ambiguous and require user input to resolve.

As discussed above, the 3$^{rd}$ party applications may rely on a regular expressions to register patterns 16. A regex routine may therefore be included in the pattern analyzer 50 to support recognition of such 3$^{rd}$ party registrations making use of the local copy 60 of the 3$^{rd}$ party registry 36. The registration of regex patterns 16 can be implemented statically or at runtime. The pattern analyzer 50 and client library 12 may also be configured to support localized regex patterns 16, e.g. to have different regex patterns 16 used in different locales. In this way, a 3$^{rd}$ party application 46 can respond to detected changes in locale and update the regex patterns 16 that it has registered. For example, a previous set of regex registrations can be removed and replaced by a new set specific to the new locale. It can be appreciated that the communications between the application 46, the pattern analyzer 50, and the client library 12 may be asynchronous to avoid degrading performance of the application 46, but for small text blobs can be run on the same thread as the application 46.

Figure 5:
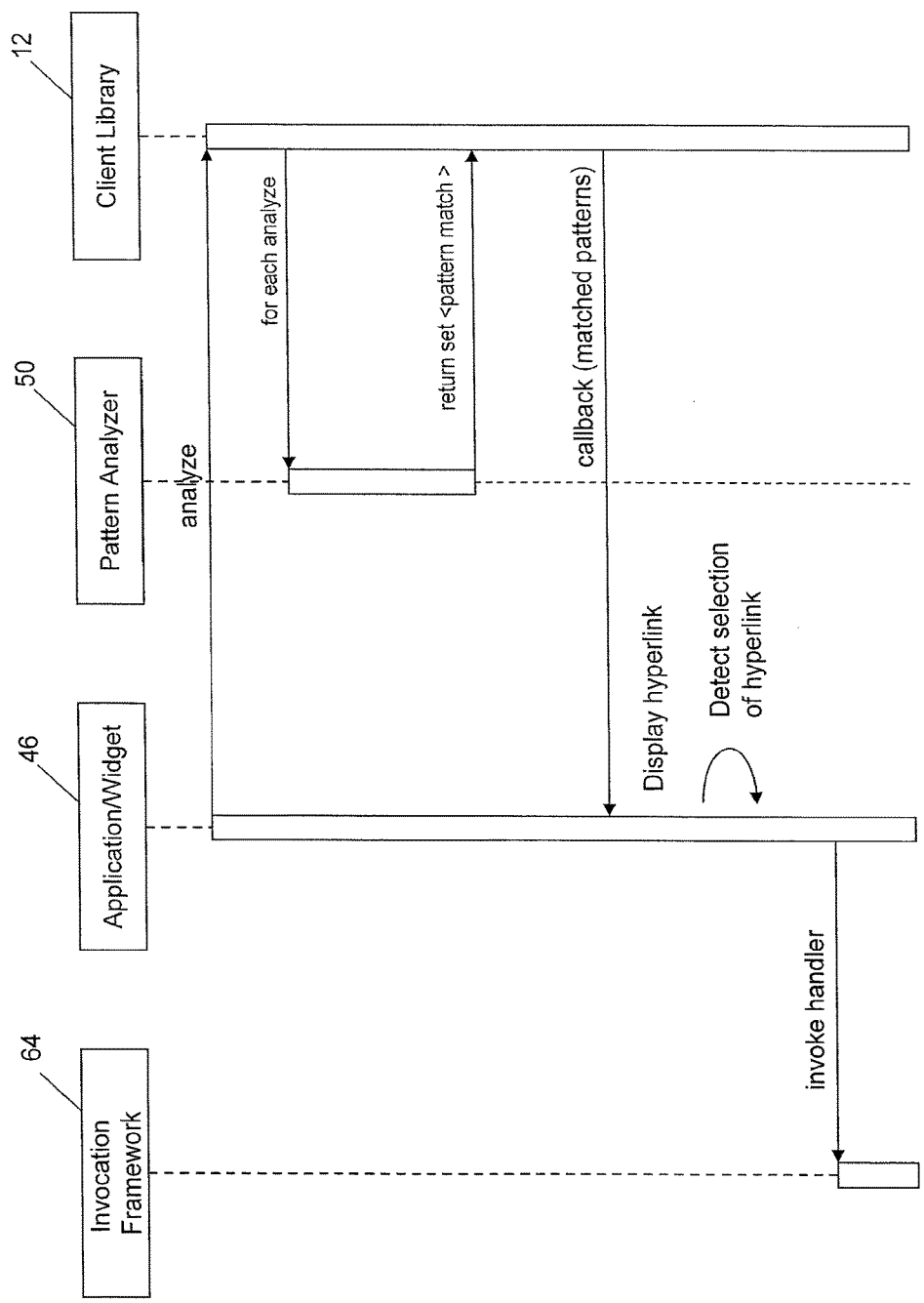
FIG. 5 is a sequence diagram illustrating an example of a pattern analysis and action invocation method.

As illustrated in FIG. 5, an application 46 may pass a portion of text 17 (FIG. 1) to the pattern analyzer 50, which uses the client library 12 to analyze the text 17 for pattern matches. The pattern analyzer 50 will reference the client library 12 for each pattern 16 (FIG. 4) that can be identified in the text 17 and for each analysis, the client library 12 will return a set of pattern matches. For example, the client library 12 may register a ten digit number as being a likely telephone number and if the pattern 16 being analyzed contains ten successive digits, a matched pattern is returned.

The set of pattern matches are sent back to the application 46 to enable the application 46 to merge the results with the text 17 and thus provide links within the text 17 (e.g., using hyperlinks 22 as shown in FIG. 1). The hyperlinked 22 text 17 may be displayed such that a user may select a particular hyperlink 22. After detecting selection of a hyperlink 22, an invocation framework 64 or other subsystem or service is used to invoke the handler 58 associated with the selected pattern 16. For example, if the user selects a hyperlinked phone number, the invocation framework 64 is initiated to have the phone application 46 invoked and passed the phone number to dial that number.

FIG. 6 provides a flow chart illustrating example computer executable operations that may be performed in updating a 3$^{rd}$ party registry 36 (FIG. 2) and making the 3$^{rd}$ party registry 36 available to client processes 30 (FIGS. 2 and 3). At 100, the 3$^{rd}$ party registry 36 is provided on a server 32 with an associated registry service 34 as shown in FIG. 2. The registry service 34 enables 3$^{rd}$ party applications 46 and application developers to register patterns 16 at 102. For example, a maps application 46 may wish to register location-based patterns for invoking a map at that location, a social media application 46 may register a social network name (e.g., Facebook®) to invoke the social media application 46 when the name is detected, etc. As registrations are added, the 3$^{rd}$ party registry 36 is updated at 104, and the 3$^{rd}$ party registry 36 is made available to client processes 30 at 106. By making the 3$^{rd}$ party registry 36 available to the client processes 30, when the a client device 300 installs a particular 3$^{rd}$ party application 46, registrations associated with that application 46 can be added to the client library 12 for the client process 30. Similarly, if an application developer updates an application 46 already installed or otherwise adds new registrations to the 3$^{rd}$ party registry 36, client processes 30 can utilize the registry service 34 to locally update the copy 60 of the 3$^{rd}$ party registry 36 in the client library 12.

FIG. 7 provides a flow chart illustrating example computer executable operations that may be performed in updating a client library 12 (FIGS. 2 and 3) for a client process 30 (FIGS. 2 and 3). The client device 300 may include, at the time manufacture or registration or provisioning, the client library 12 and the pattern analyzer 50 (FIG. 3), e.g., as a core application and service, or the client library 12 and pattern analyzer 50 may be otherwise provided at a later time at 110. By having access to the client library 12 and pattern analyzer 50, updates may be initiated in various ways, examples of which are shown in FIG. 7. For example, the pattern analyzer 50, client library 12 operating system (OS), or other component or service of the client process 30 may detect the installation of a new application 46 at 112. After detecting an new installation, the pattern analyzer 50 or client library 12 may communicate with the registry service 34 of the server process 32 to determine and add registrations associated with the new application 46 at 114. Similarly, the pattern analyzer 50, client library 12 operating system, or other component or service of the client process 30 may determine at 116 that the local 3$^{rd}$ party registry 60 needs to be updated. For example, the pattern analyzer 50, client library 12 operating system, or other component or service of the client device 30 may poll the registry service 34 or receive an update notice from the registry service 34. After determining that the local copy 60 of the 3$^{rd}$ party registry 36 requires updating, the client library 12 is synchronized with the 3$^{rd}$ party registry 36 using the registry service 34 at 118 and any new 3$^{rd}$ party registrations are added to the client library 12 at 120.

Figures 8, 9:
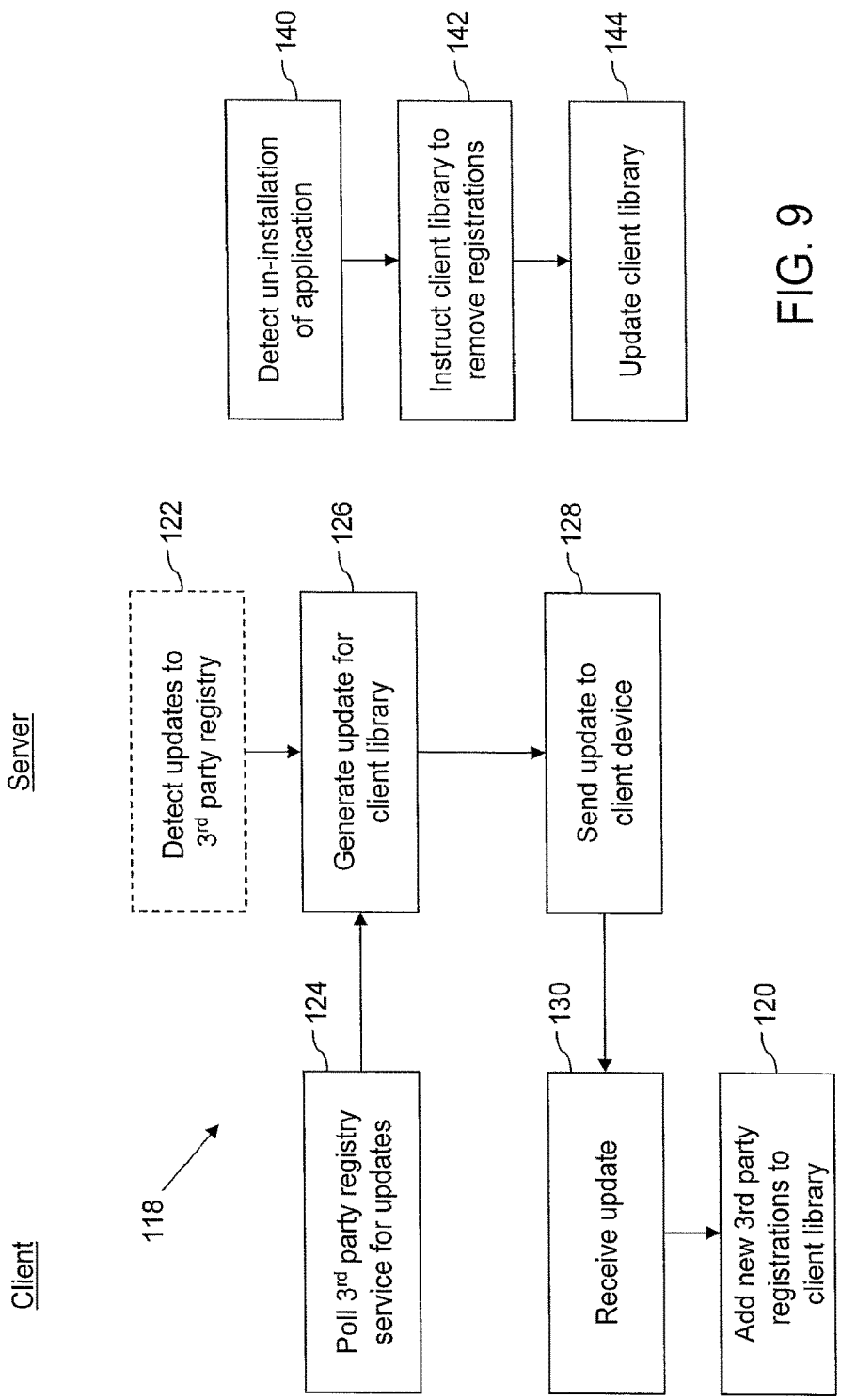
FIG. 8 is a flow chart illustrating example computer executable operations that may be performed in obtaining client library updates to $3^{rd}$ party registrations for a registration service on a server process.
FIG. 9 is a flow chart illustrating example computer executable operations that may be performed in removing registrations after detecting an un-installation of an application.

FIG. 8 illustrates one example method for synchronizing the client library 12 with the 3$^{rd}$ party registry 36 (FIG. 2) at 118 shown in FIG. 7. At 124, the client process 30 (FIGS. 2 and 3) polls the 3$^{rd}$ party registry 36 (FIG. 2) by communicating with the registry service 34 (FIG. 2). In other examples (shown in dashed lines), the server process 32 may initiate the update process by detecting updates to the 3$^{rd}$ party registry 36 at 122. The registry service 34 at the server generates an update for the client library 12 at 126 and sends the update to one or more client processes 30 at 128. The client process 30 receives the update at 130 and any new 3$^{rd}$ party registrations are added to the client library 12 at 120 (see also FIG. 7).

FIG. 9 provides a flow chart illustrating example computer executable operations that may be performed in removing registrations after detecting an un-installation of an application 46 (FIG. 3). At 140, the client process 30 (FIGS. 2 and 3) detects the un-installation of an application 46, instructs the client library 12 (FIGS. 2 and 3) to remove registrations associated with that application 46 at 142, and the client library 12 is updated at 144 accordingly.

Figure 10:
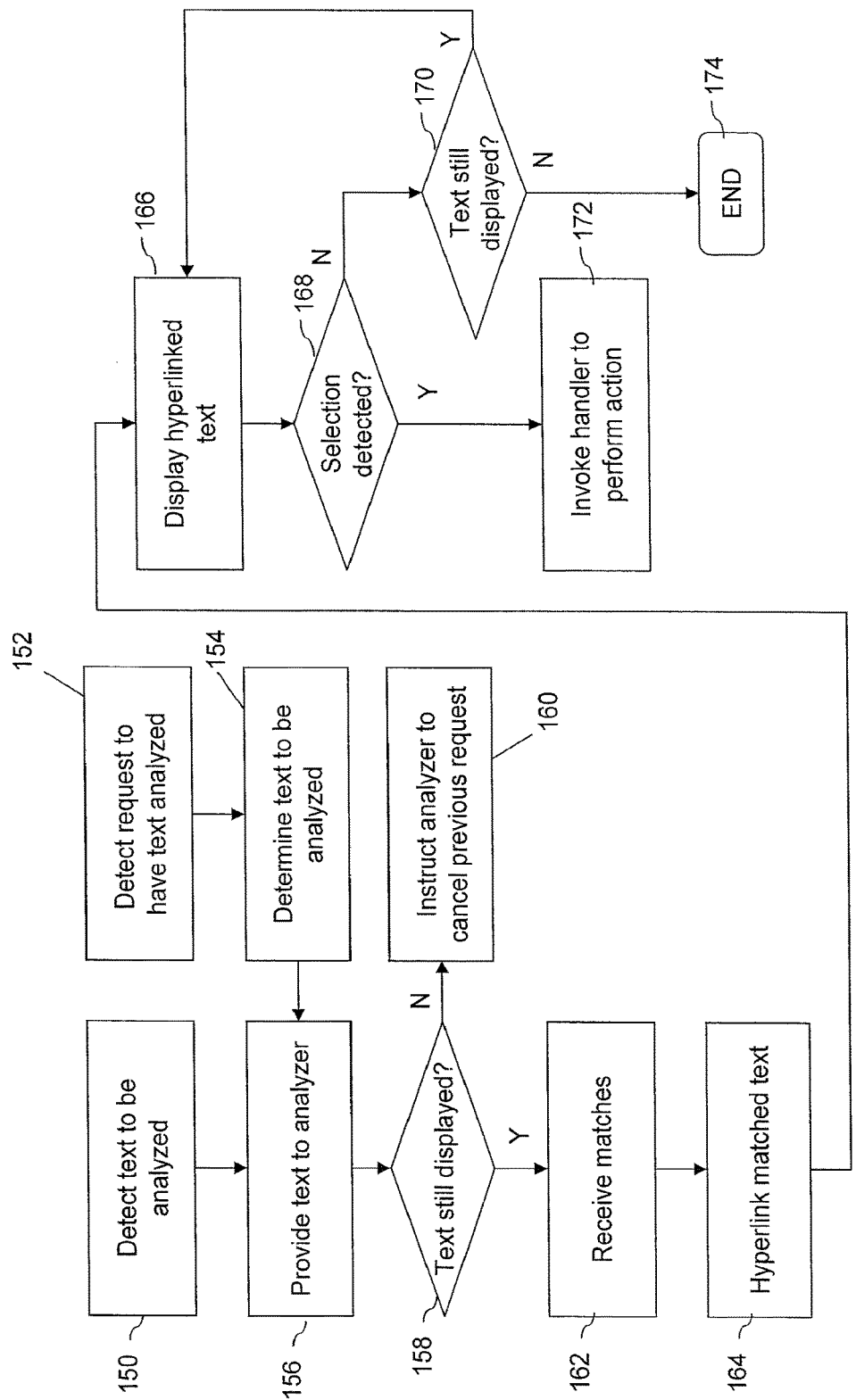
FIG. 10 is a flow chart illustrating example computer executable operations that may be executed in performing a pattern analysis of text in an application or text widget and adding links to the text based on matched patterns.

FIG. 10 provides a flow chart illustrating example computer executable operations that may be executed in performing a pattern analysis of text 17 (FIG. 1) in an application 46 (FIG. 3) and adding links, such as hyperlinks 22 (FIG. 1), to the text 17. As discussed above, the applications 46 (FIG. 3) may utilize an active mode to have particular text 17 always analyzed, e.g., text 17 in an email; or may use an API 48 (FIG. 3) to query the pattern analyzer 50 (FIG. 3) to have particular text 17 analyzed. For example, at 150, the application 46 may detect text 17 to be analyzed as a matter of routine, or may detect a request or event within the application 46 at 152 to have particular text analyzed (e.g., based on a user selection, etc.). When detecting a request to have text 17 analyzed, the text 17 to be provided to the pattern analyzer 50 via the API 48 is determined at 154. Text 17 may then be provided to the pattern analyzer 50 at 156.

To avoid causing apparent delays in text rendering, the pattern analyses may be done in the background by sending the text 17 to be analyzed to the pattern analyzer 50 at 156 and results that are eventually received at 162 and merged with the text 17 to provide the linking at 164. While the text 17 is being analyzed for pattern matches, the application 46 requesting the analysis can be configured to enable cancellation of a previous request. For example, as shown in FIG. 10, the application 46 may determine at 158 whether or not the text 17 associated with the request is still being displayed. The text 17 may no longer be displayed if, for example, the user exits a screen with the text 17 before the pattern matching has been completed. If not, the results of the previous request are no longer required and the pattern analyzer 50 can be instructed to cancel the previous request at 160. In this way, the resources can be freed for the analysis of new text portions, etc.

The hyperlinked text 17 is displayed by the application 46 at 166 and the application 46 determines at 168 whether or not a selection of a particular hyperlink 22 has been detected. If not, the application 46 determines at 170 if the hyperlinked text 17 is still being displayed. If so, operations 166 and 168 are repeated. If the text 17 is no longer being displayed, and a selection has not been made, the operations concerning the analyzed text 17 ends at 174. If a selection is detected by the application 46 at 168, the handler 58 associated with the hyperlinked string 22 is invoked at 172 in order to perform the specified action. As discussed above, an invocation framework 64 may be called to have the action executed.

Figure 11:
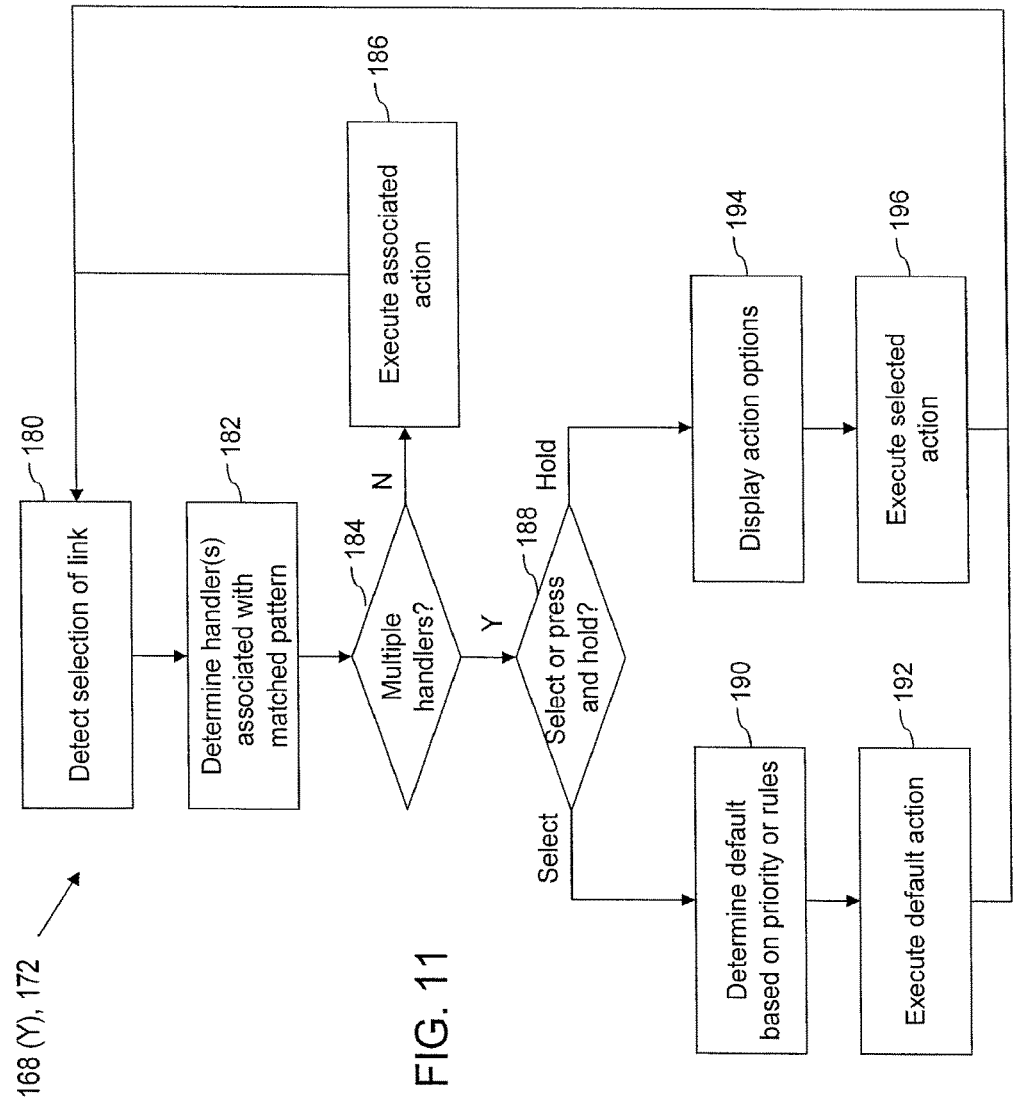
FIG. 11 is a flow chart illustrating example computer executable operations that may be performed in invoking an action after detecting selection of a linked string.

FIG. 11 provides one example set of operations that may be performed in invoking at 172 an action after detecting selection of a linked string at 168. At 180 the application 46 (FIG. 3) detects selection of a hyperlink 22 (FIG. 1) and determines the handler(s) 58 (FIG. 4) associated with the pattern 16 (FIG. 4) at 182. It can be appreciated that the application 46 may query the client library 12 (FIGS. 2 and 3) to determine the associated handlers 58 or the associated handlers 58 may have been previously provided with the matched patters returned by the client library 12 and pattern analyzer 50.

It can be appreciated that the same pattern 16 may generate multiple matches. For example, a 10 digit sequence of numbers may be registered as a potential phone number by a phone application 46 to invoke the phone application 46 as well as by a text messaging application for sending text messages. The 10 digit sequence may also be registered as a personal identification number (PIN) by an instant messaging application 46 or by an e-commerce application as being potential tracking numbers for a parcel delivery service. Accordingly, the same pattern 16 or type of pattern 16 may have multiple handlers 58 associated therewith that can be returned for a given portion of text 17. Similarly, a pattern 16 may be detected independently or as a portion of a larger pattern 16 or set of patterns 16. For example, a 7 digit number may be associated with a phone number without an area code as well as a portion of an address that is registered as a combination of a number followed by additional text 17, e.g., "1234567 Main Street". As such, matches may overlap (partially or completely), subsume other matches, or be subsumed by other matches.

To address the possibility of multiple handlers 58 being associated with a particular hyperlink 22, the application 46 determines at 184 whether or not multiple handlers 58 were returned in association with the selected hyperlink 22. If not, the handler 58 that is associated with the selected hyperlink is invoked and the associated action executed at 186. If there are multiple handlers 58, the application 46 may select a default handler 58, prompt the user to select a desired action, or enable both default selection and optional selection according to the nature of the detected input, as shown by way of example in FIG. 11.

In the example shown in FIG. 11, if multiple handlers 58 are determined at 184, the application 46 can vary how the actions are handled based on a nature of the input detected. For example, at 188 the application 46 determines whether the hyperlink 22 is selected using a selection or a press and hold. If a selection is detected (e.g., finger tap, single button press, etc.) a default match is determined at 190 based on, for example, assigned priorities or a rule set and the action associated with the default match is executed at 192. If the detected input is a press and hold, the application 46 may display action options at 194, e.g., using a prompt or other selection mechanism, and the action associated with a selected one of the options executed at 196. For example, if a 10 digit number is hyperlinked and the user presses and holds the hyperlink 22, a prompt may be displayed asking the user whether they wish to call the specified number or send a text message to the specified number. If the number is in an address book, additional information about the contact associated with the number may also be displayed, e.g., a photo or avatar.

As shown in FIG. 11, at 190 a default one of multiple matches may be selected, in one example, according to priorities assigned to particular patterns 16. For example, match for a pattern 16 registered with a handler 58 for invoking a phone application may have a higher priority than invoking a text message application, but may have a lower priority than a match for the same pattern 16 when found in an address, which would invoke an address book or contact profile.

Figures 12, 13:
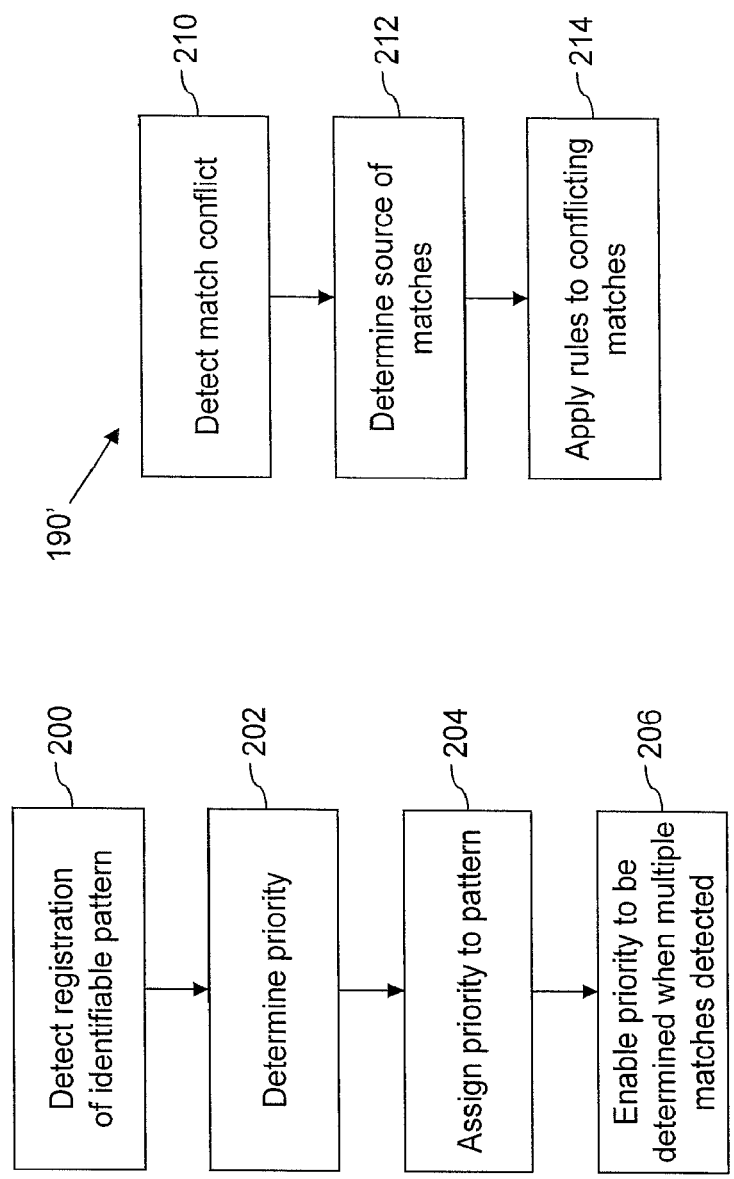
FIG. 12 is a flow chart illustrating example computer executable operations that may be performed in assigning priorities to identifiable patterns being registered.
FIG. 13 is a flow chart illustrating example computer executable operations that may be performed in applying rules to resolving duplicate matches in a pattern analysis.

FIG. 12 provides a flow chart illustrating example computer executable operations that may be performed in assigning priorities to patterns 16 (FIG. 4) being registered. At 200 the registry service 34 (FIG. 2) detects that a pattern 16 is being registered and determines a priority at 202. It can be appreciated that the priority may be assigned by the application developer, an administrator, or deterministically by the registry service 34 itself. A set of rules for assigning priorities may also be used based on the source of the registration. For example, system registrations for core applications may have a priority tier that cannot be achieved by a $3^{rd}$ party registration. Similarly, within $3^{rd}$ party registrations, the $3^{rd}$ parties themselves may be ranked based on relationships with the administrator of the server process 32. For example, the registry service 34 may utilize a subscription model for $3^{rd}$ parties wishing to have matches prioritized over non-subscribers. At 204, the priority determined at 202 is assigned to the pattern registration, and the $3^{rd}$ party registry enables the priority to be determined at 206, e.g., by providing such priorities when updating local client libraries 12, returning the priority in association with a query related to the pattern 16, etc.

At 190 in FIG. 11, a set of rules may also be applied to determine a default match when multiple matches are detected.

FIG. 13 provides a flow chart 190' illustrating example computer executable operations that may be performed in applying rules to resolve duplicate matches in a pattern analysis 14 (FIG. 1). At 210, a match conflict is detected. In the example shown in FIG. 13, the rules being applied are based on the source of the matches, i.e., whether the application 46 that registered the pattern 16 associated with the match was internal (e.g., core or system application) or external (e.g., $3^{rd}$ party). The source of each conflicting match is determined at 212 and the rules are applied to the conflicting matches at 214.

Figure 14:
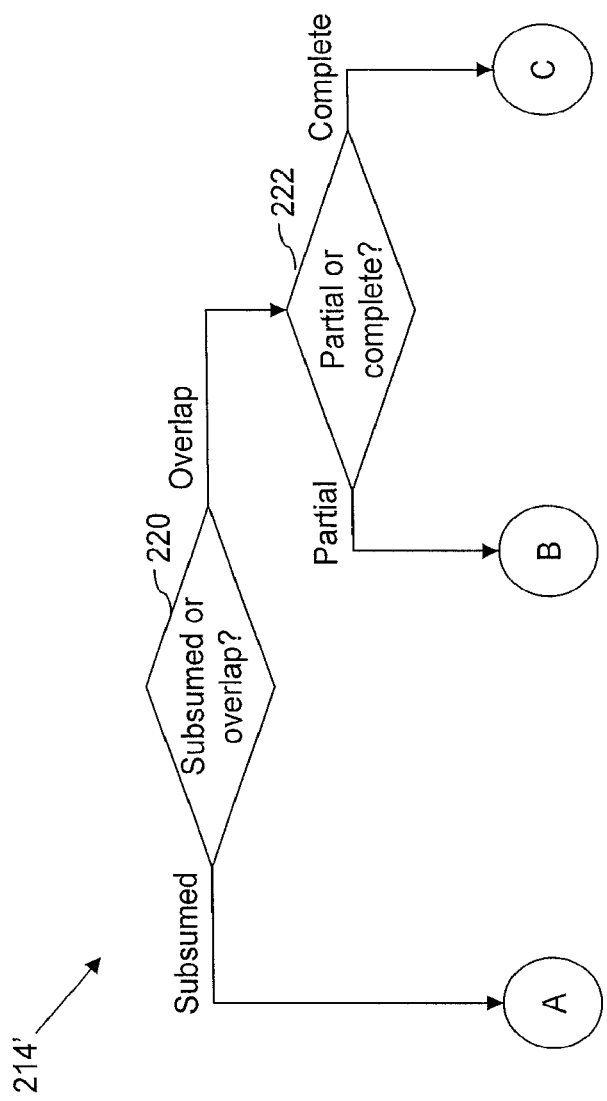
FIG. 14 is a flow chart illustrating example computer executable operations that may be performed in applying rules to subsumed or overlapping pattern matches.

An example of an application of a set of rules at 214 is shown in FIGS. 14 to 17, denoted by 214' in FIG. 14.

In the example set of rules shown in FIG. 14, the application 46 (FIG. 3) determines whether the conflicting matches have one match subsuming another match, or whether there is an overlap of the matches. For example, a 7 digit number may return two matches, a local phone number (i.e., without an area code), and an address that includes a 7 digit street number, the address subsuming the phone number. Overlapping matches may include the same number being associated with two items, or a matched pattern may partially overlap two items. For example, a 7 digit number may be both a phone number and a PIN, or a 5 digit number may identify an apartment number in one address as well as a ZIP code in another address. It can be appreciated that when determining overlapping patterns, the pattern analyzer 50 may disregard nonsense overlaps. For example the text: "mailto: user@company.com" would produce a single "mailto" match rather than a "mailto" match, an email address match, and a URL match.

At 220, the application 46 determines if one of the conflicting matches subsumes the other, or if there is an overlap conflict. If one match subsumes the other, route A shown in FIG. 14 is taken. If an overlap of matches is detected, the application 46 determines at 222 whether the overlap is partial (e.g., same number found in two larger patterns 16) or complete (e.g., the same number could mean two different things). If the overlap is partial, route B in FIG. 14 is taken and if the overlap is complete, route C is taken.

Figure 15:
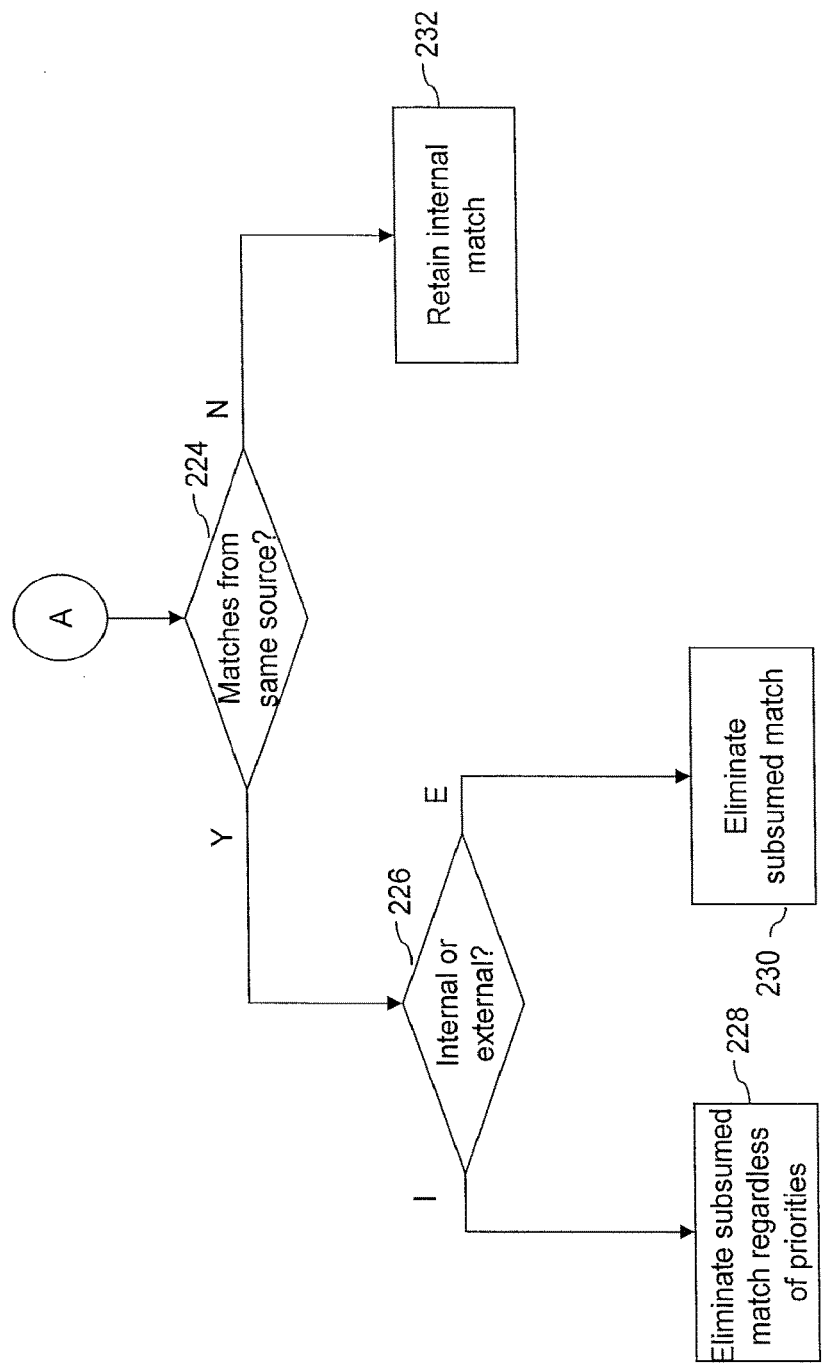
FIG. 15 is a flow chart illustrating example computer executable operations that may be performed in resolving subsumed pattern matches.

FIG. 15 illustrates route A. At 224, the application 46 (FIG. 3) determines whether or not the matches are from the same type of source, i.e. both external or both internal. If so, the application determines at 226 whether the source is internal or external. If the two matches are from internal sources, the subsumed match is eliminated regardless of the priorities assigned to the matches at 228. This may be done since, in general, the longer match will more likely produce the link that the user would be interested in, e.g., as in the "mailto" example discussed above. In the example above, the match associated with the phone number would be eliminated that that associated with the address identified as the default. If the two matches are from external sources, i.e., both $3^{rd}$ party registrations, the subsumed match is also eliminated at 230, and the subsuming match set as the default.

If the matches are not from the same type of source, e.g., one match is from an internal source and the other is from an external source, the internal match is retained at 232. In other words, the rule set in this example does not allow matches from external sources to eliminate matches from internal sources.

Figure 16:
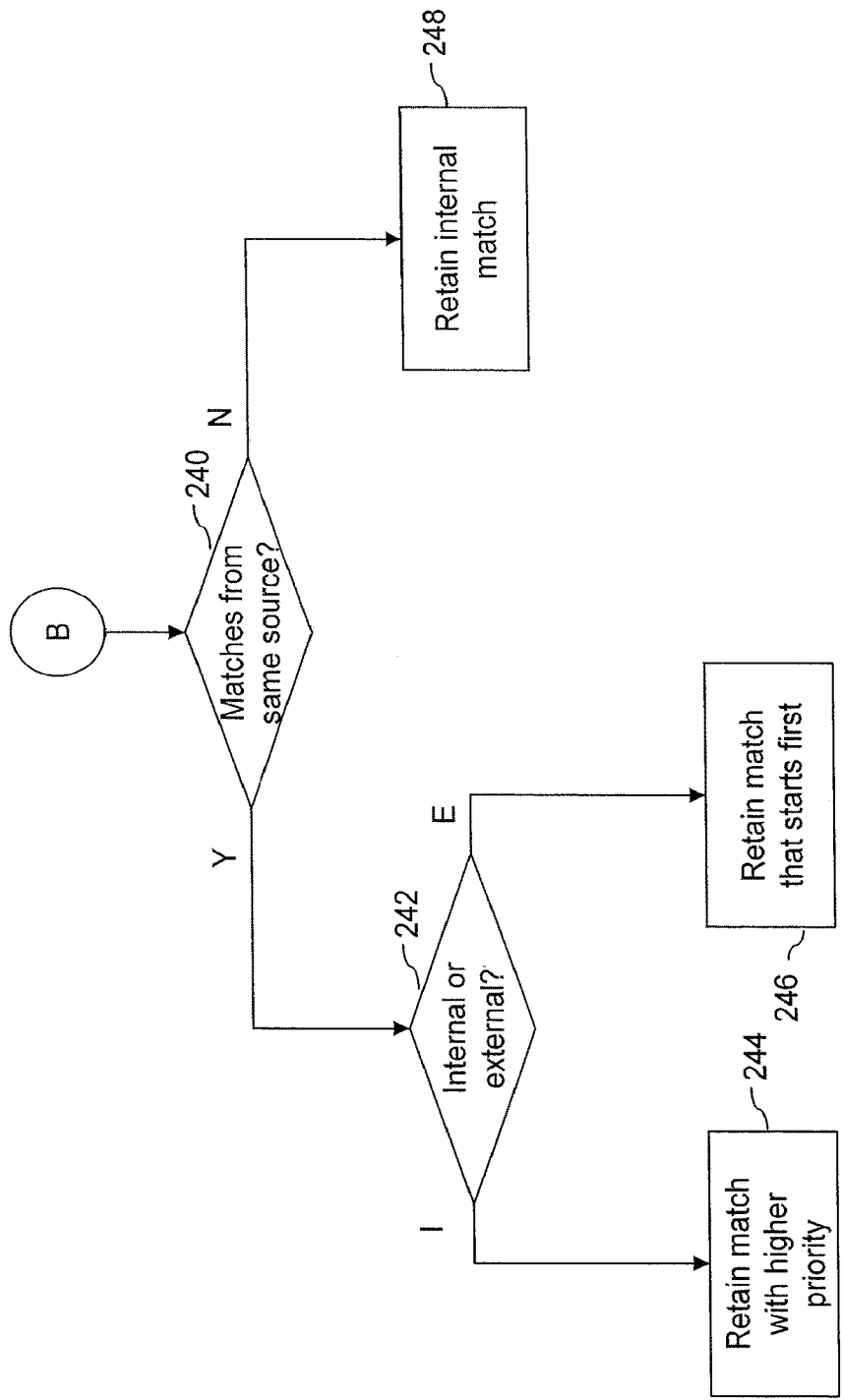
FIG. 16 is a flow chart illustrating example computer executable operations that may be performed in resolving partially overlapping pattern matches.

FIG. 16 illustrates route B shown in FIG. 14, which is taken when there is a partial overlap of the matches. At 240, the application 46 (FIG. 3) determines whether or not the matches are from the same source. If so, the application 46 determines at 242 if the matches are internal or external. If internal, the match with the higher priority is retained at 244. If the matches are both external, the match that starts first is retained at 246 by comparing where each match begins in the text 17. In such a rule, the match which begins first is chosen, e.g., when priorities are not available, such as for $3^{rd}$ party applications. If the matches are not from the same source, the internal match is retained at 248.

Figure 17:
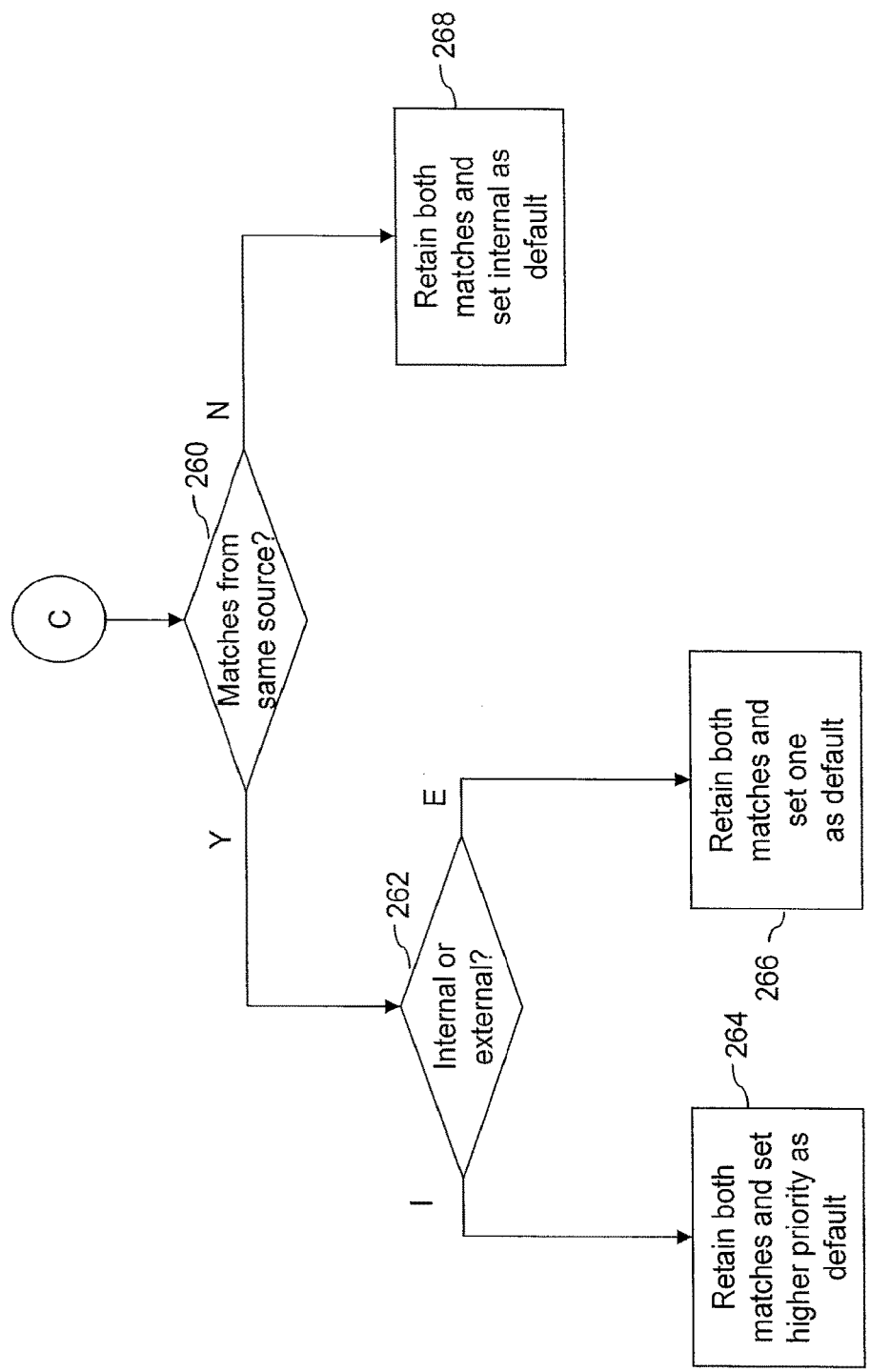
FIG. 17 is a flow chart illustrating example computer executable operations that may be performed in resolving completely overlapping pattern matches.

FIG. 17 illustrates route C shown in FIG. 14, which is taken when there is a complete overlap of the matches. At 260, the application 46 (FIG. 3) determines whether or not the matches are from the same source. If so, the application 46 determines at 262 if the matches are internal or external. If internal, both matches are retained and the match with the higher priority is set as the default selection at 264. If the matches are both external, both matches are retained and one of the matches is set as the default in an arbitrary but deterministic way at 266. If the matches are not from the same source, both matches are retained and the internal match is set as the default at 268.

Figure 18:
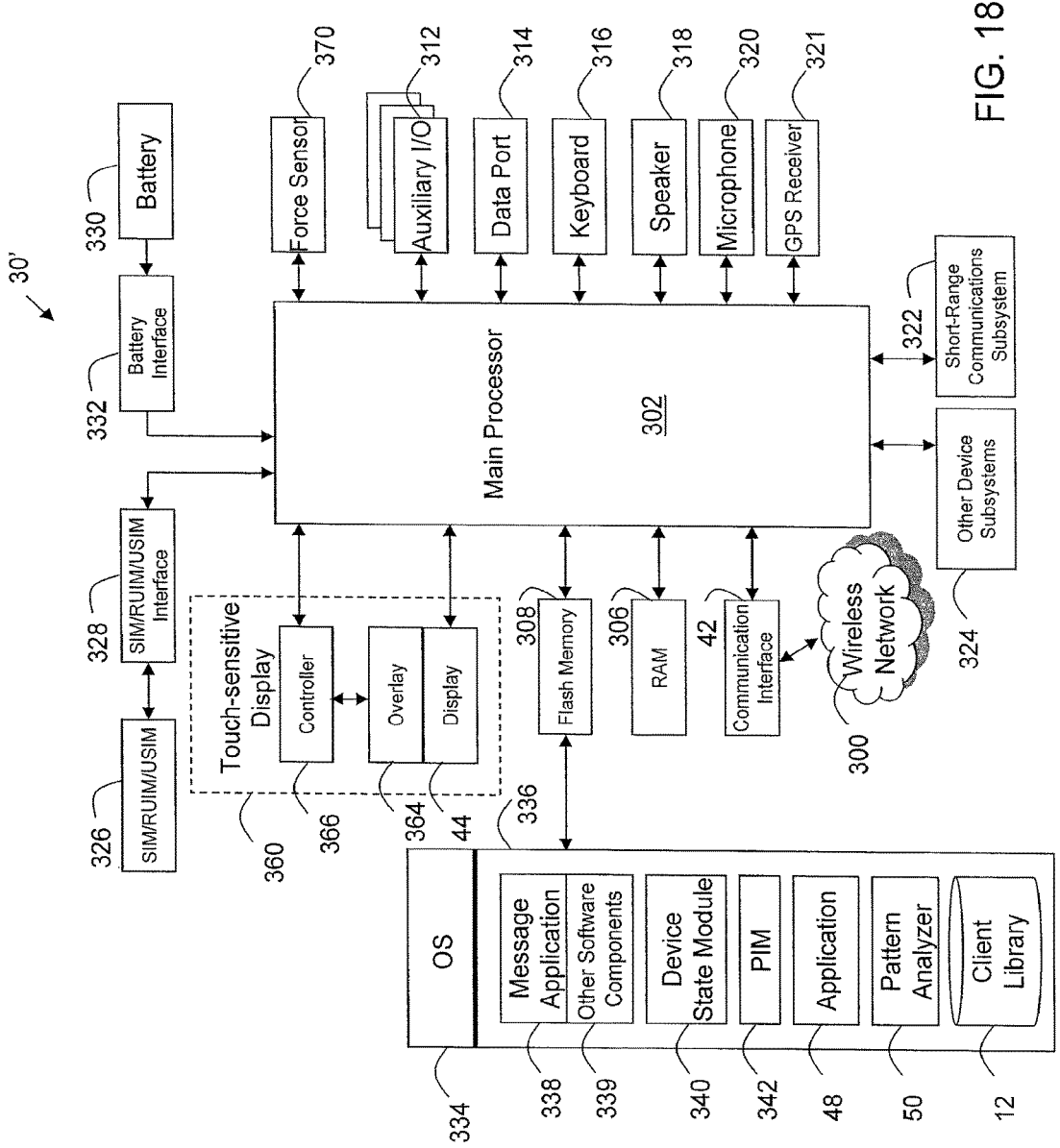
FIG. 18 is a block diagram of an example of a client device.

Referring to FIG. 18, shown therein is a block diagram of an example configuration of a client device 30' configured to communicate over a wireless network 300, e.g., a smart phone, tablet, cell phone, portable gaming device, etc. The client device 30' includes a number of components such as a main processor 302 that controls the overall operation of the client device 30'. Communication functions, including data and voice communications, are performed through a communication interface 42. The communication interface 42 receives messages from and sends messages to a wireless network 300. In this example of the client device 30', the communication interface 42 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 42 with the wireless network 300 represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316 (physical, virtual, or both), a speaker 318, a microphone 320, a GPS receiver 321, short-range communications subsystem 322, and other device subsystems 324. Some of the subsystems of the client device 30' perform communication-related functions, whereas other subsystems may provide "resident" or on-device functions. By way of example, the touch-sensitive display 360 and the keyboard 316 may be used for both communication-related functions, such as entering a text message for transmission over the wireless network 300, and device-resident functions such as a calculator or task list. In one example, the client device 30' can include a non touch-sensitive display in place of, or in addition to the touch-sensitive display 360. For example the touch-sensitive display 360 can be replaced by a display 44 that may not have touch-sensitive capabilities.

The client device 30' can send and receive communication signals over the wireless network 300 after required network registration or activation procedures have been completed. Network access is associated with a subscriber or user of the client device 30'. To identify a subscriber, the client device 30' may use a subscriber module component or "smart card" 326, such as a Subscriber Identity Module (SIM), a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network.

The client device 30' is typically a battery-powered device and includes a battery interface 332 for receiving one or more rechargeable batteries 330. In at least some examples, the battery 330 can be a smart battery with an embedded microprocessor. The battery interface 332 is coupled to a regulator (not shown), which assists the battery 330 in providing power to the client device 30'. Although current technology makes use of a battery, future technologies such as micro fuel cells may provide the power to the client device 30'.

The client device 30' also includes an operating system 334 and software components 336 to 342, 48, 50, and 12 (see also FIG. 3). The operating system 334 and the software components 336 to 342, 48, 50, and 12, that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 342, 48, 50, and 12, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the client device 30' during its manufacture. Software applications may include a message application 338, a device state module 340, a Personal Information Manager (PIM) 342, an application 48 having text to be analyzed, and a pattern analyzer 50. A client library 12 is also shown, which may be located in a memory or other data storage device. A message application 338 can be any suitable software program that allows a user of the client device 30' to send and receive electronic messages, wherein messages are typically stored in the flash memory 308 of the client device 30'. A device state module 340 provides persistence, i.e. the device state module 340 ensures that important device data is stored in persistent memory, such as the flash memory 308, so that the data is not lost when the client device 30' is turned off or loses power. A PIM 342 includes functionality for organizing and managing data items of interest to the user, such as, but not limited to, e-mail, contacts, calendar events, and voice mails, and may interact with the wireless network 300.

Other types of software applications or components 339 can also be installed on the client device 30'. These software applications 339 can be pre-installed applications (i.e. other than message application 338) or third party applications, which are added after the manufacture of the client device 30'. Examples of third party applications include games, calculators, utilities, etc.

The additional applications 339 can be loaded onto the client device 30' through at least one of the wireless network 300, the auxiliary I/O subsystem 312, the data port 314, the short-range communications subsystem 30, or any other suitable device subsystem 324.

The data port 314 can be any suitable port that enables data communication between the client device 30' and another computing device. The data port 314 can be a serial or a parallel port. In some instances, the data port 314 can be a universal serial bus (USB) port that includes data lines for data transfer and a supply line that can provide a charging current to charge the battery 330 of the client device 30'.

For voice communications, received signals are output to the speaker 318, and signals for transmission are generated by the microphone 320. Although voice or audio signal output is accomplished primarily through the speaker 318, the display 44 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 44 of the touch-sensitive display 360 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 360. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 360. The location of the touch moves as the detected object moves during a touch. One or both of the controller 366 and the processor 302 may detect a touch by any suitable contact member on the touch-sensitive display 360. Similarly, multiple simultaneous touches, are detected.

One or more gestures are also detected by the touch-sensitive display 360. A gesture is a particular type of touch on a touch-sensitive display 360 that begins at an origin point and continues to an end point. A gesture may be identified by attributes of the gesture, including the origin point, the end point, the distance travelled, the duration, the velocity, and the direction, for example. A gesture may be long or short in distance and long or short in duration. Two points of the gesture may be utilized to determine a direction of the gesture.

An example of a gesture is a swipe (also known as a "flick"). A swipe has a single direction. The touch-sensitive overlay 364 may evaluate swipes with respect to the origin point at which contact is initially made with the touch-sensitive overlay 364 and the end point at which contact with the touch-sensitive overlay 364 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 364 to initialize the gesture, a horizontal movement of the detected object from the origin point to an end point towards the right or left side of the touch-sensitive overlay 364 while maintaining continuous contact with the touch-sensitive overlay 364, and a breaking of contact with the touch-sensitive overlay 364. Similarly, a vertical swipe typically comprises an origin point towards the top or bottom of the touch-sensitive overlay 364 to initialize the gesture, a horizontal movement of the detected object from the origin point to an end point towards the bottom or top of the touch-sensitive overlay 364 while maintaining continuous contact with the touch-sensitive overlay 364, and a breaking of contact with the touch-sensitive overlay 364.

Swipes can be of various lengths, can be initiated in various places on the touch-sensitive overlay 364, and need not span the full dimension of the touch-sensitive overlay 364. In addition, breaking contact of a swipe can be gradual in that contact with the touch-sensitive overlay 364 is gradually reduced while the swipe is still underway.

Meta-navigation gestures may also be detected by the touch-sensitive overlay 364. A meta-navigation gesture is a gesture that has an origin point that is outside the display area of the touch-sensitive overlay 364 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 364. Thus, two fingers may be utilized for meta-navigation gestures. Further, multi-touch meta-navigation gestures may be distinguished from single touch meta-navigation gestures and may provide additional or further functionality.

In some examples, an optional force sensor 370 or force sensors is disposed in any suitable location, for example, between the touch-sensitive display 360 and a back of the client device 30' to detect a force imparted by a touch on the touch-sensitive display 360. The force sensor 370 may be a force-sensitive resistor, strain gauge, piezoelectric or piezoresistive device, pressure sensor, or other suitable device. Force as utilized throughout the specification refers to one or more of force measurements, estimates, and calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the client device 30, client device 30', server 32, or any component of or related to the client device 30, client device 30', server 32, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method comprising:
    receiving, at a registry service associated with a client library stored at a client process running on a client device, a request to register an identifiable pattern in a third party registry of identifiable patterns for matching patterns in text used by the client process running on the client device, the registry service and the third party registry being at a server process separate from, and coupled via a communication interface with, the client process running on the client device, and the client library stored at the client process running on the client device;
    registering, with the registry service, the identifiable pattern in the third party registry;
    registering, with the registry service, a corresponding handler in the third party registry, the corresponding handler being associated with the identifiable pattern in the third party registry, the corresponding handler identifying an action for the client process to perform based on a selection of the identifiable pattern at the client process;
    generating, with the registry service, an update for a client-side copy of the third party registry maintained at the client library, the update comprising the identifiable pattern and the corresponding handler; and
    communicating the update from the server process, via the communication interface, for reception of the update by the client process running on the client device, and for initiating an updating of the client library at the client process with the identifiable pattern and the corresponding handler.

2. The method of claim 1, wherein the third party registry comprises at least one registration provided by a third party application.

3. The method of claim 1, the client library further comprising a system registry for core applications in addition to the client-side copy of the third party registry maintained updated by the registry service.

4. The method claim 1, the registry service being provided with the server process.

5. The method of claim 4, the server process and at least one corresponding client process being located on a same device.

6. The method of claim 4, the server process and at least one client process being located on different devices, the server process running on a server device in a communication network coupled via a communication interface with the client process running on the client device, and wherein the server process communicating the update, via the communication network and the communication interface, for reception of the update by the client process at the client device.

7. The method claim 1, further comprising:
    detecting an un-installation of an application; and
    updating the client library to remove at least one registration of identifiable patterns associated with the un-installed application.

8. The method of claim 7, further comprising updating the third party registry responsive to detecting the un-installation of the application.

9. The method of claim 1, wherein the updating is performed according to one of a push model and a pull model.

10. The method of claim 1, further comprising:
    detecting, at the client process, text to be analyzed;
    analyzing the text for identifiable patterns in the client library;
    receiving at least one match between the text and an identifiable pattern; and
    linking the match in the text.

11. The method of claim 10, further comprising:
    detecting selecting of a linked match in the text; and
    invoking the corresponding handler associated with the identifiable pattern to perform an associated action.

12. The method of claim 11, further comprising:
    determining that the linked match has a plurality of handlers; and
    selecting one of the plurality of handlers.

13. The method of claim 12, the selecting being detected from a user input.

14. The method of claim 13, the user input being detected from a menu or based on a nature of the user input.

15. The method of claim 14, wherein detecting a selection of the linked match initiates a default handler determined based on a priority or a set of rules and detecting a press and hold operation displays the plurality of handlers for selection.

16. The method of claim 10 further comprising:
    detecting a match conflict;
    determining a source for each match conflict, the source being a core application or a third party application; and
    applying one or more rules to the conflicting matches using at least the source.

17. The method of claim 16, wherein one match subsumes another match, the method further comprising:
    eliminating the subsumed match when both matches are from the same source; and
    retaining a match from a core application when both matches are from different sources.

18. The method of claim 16, wherein one match overlaps another, the method further comprising:
    retaining a match with a higher priority when both matches are from core applications and there is a partial overlap;
    retaining a match that begins earlier in the text when both matches are from third party applications and there is a partial overlap; and
    retaining a match from a core application when the matches are from different sources.

19. The method of claim 16, wherein one match overlaps another, the method further comprising:
    retaining both matches and setting the match with a higher priority as a default when both matches are from core applications and there is a complete overlap; and
    retaining a match that begins earlier in the text when both matches are from third party applications and there is a partial overlap; and
    retaining both matches and setting a match from a core application as a default when the matches are from different sources.

20. A non-transitory computer readable storage medium comprising computer executable instructions for:
    receiving, at a registry service associated with a client library stored at a client process running on a client device, a request to register an identifiable pattern in a third party registry of identifiable patterns for matching patterns in text used by the client process running on the client device, the registry service and the third party registry being at a server process separate from, and coupled via a communication interface with, the client process running on the client device, and the client library stored at the client process running on the client device;

registering, with the registry service, the identifiable pattern in the third party registry;

registering, with the registry service, a corresponding handler in the third party registry, the corresponding handler being associated with the identifiable pattern in the third party registry, the corresponding handler identifying an action for the client process to perform based on a selection of the identifiable pattern at the client process;

generating, with the registry service, an update for a client-side copy of the third party registry maintained at the client library, the update comprising the identifiable pattern and the corresponding handler; and communicating the update from the server process, via the communication interface, for reception of the update by the client process running on the client device, and for initiating an updating of the client library at the client process with the identifiable pattern and the corresponding handler.

21. An electronic device comprising a processor and memory, the memory comprising computer executable instructions, the processor, responsive to the computer instructions, performing the following:

receiving, at a registry service associated with a client library stored at a client process running on a client device, a request to register an identifiable pattern in a third party registry of identifiable patterns for matching patterns in text used by the client process running on the client device, the registry service and the third party registry being at a server process separate from, and coupled via a communication interface with, the client process running on the client device, and the client library stored at the client process running on the client device;

registering, with the registry service, the identifiable pattern in the third party registry;

registering, with the registry service, a corresponding handler in the third party registry, the corresponding handler being associated with the identifiable pattern in the third party registry, the corresponding handler identifying an action for the client process to perform based on a selection of the identifiable pattern at the client process;

generating, with the registry service, an update for a client-side copy of the third party registry maintained at the client library, the update comprising the identifiable pattern and the corresponding handler; and communicating the update from the server process, via the communication interface, for reception of the update by the client process running on the client device, and for initiating an updating of the client library at the client process with the identifiable pattern and the corresponding handler.

* * * * *